Oct. 15, 1935.    G. R. RICH    2,017,294

POPPET VALVE

Filed Oct. 10, 1934

Inventor:
George R. Rich,
by Charles O. Shurvey,
his Atty.

Patented Oct. 15, 1935

2,017,294

UNITED STATES PATENT OFFICE 2,017,294

POPPET VALVE

George R. Rich, Pasadena, Calif.

Application October 10, 1934, Serial No. 747,658

12 Claims. (Cl. 123—177)

This invention relates to poppet valves for internal combustion engines, and its principal object is to eliminate, to a great measure, the conduction of intense heat to the head of the valve. As is well known, one of the most serious difficulties to guard against in internal combustion engines is the intense heat developed around the parts of the valve stems which are exposed above the valve guides, particularly with reference to the exhaust valves, because the hot gases discharging from the cylinders through the discharge openings, strike against the exposed parts of the valve stems and heat them excessively, the heat being conducted through the stems to the valve heads, often softening the heads to such an extent that the continuous pounding of the valves on their seats causes the heads to dish downward slightly, which change of shape in addition to the normal expansion of the stems elongates the entire valves, causing the stems to remain seated on the tappets, whereas the heads should seat on the valve seats. Obviously this condition results in poor compression and loss of power.

Various attempts have been made to overcome this difficulty, for instance, expensive steels have been employed and hollow stems, filled with heat conducting materials, have been used with but little success.

In accordance with the present invention, I provide a self-contained automatically operating air pump in the valve, which discharges the heated air from the interior of the valve at the opening and closing thereof, whereby relatively cool air constantly replenishes expelled hot air and thereby maintains the whole valve in a relatively cool condition.

Another object is to provide novel means, whereby the chattering of the valve on its seat is eliminated, and whereby lighter valve springs may be used than heretofore. Another object is to provide means whereby the friction between the valve tappet and cam is minimized. Another object is to increase the horsepower of motors equipped with valves containing the present invention. Another object is to provide a movable body in or on the valve which, due to the momentum developed during the closing movements of the valve, operates to hold the valve down on its seat during the interval of time that the valve is closed.

With these and other objects and advantages in view, this invention consists in a poppet valve having a hollow stem and a plunger reciprocating therein, whereby hot air is discharged from the interior of the valve and is replaced by relatively cool air. It further consists in a valve having a hollow stem and automatically operating means for ejecting hot air therefrom. It further consists in a poppet valve having a hollow valve stem in which is a yieldingly supported a reciprocable plunger operating on the down strokes of the valve to acquire momentum which is utilized to hold the valve on its seat during its closed position. It further consists in the several novel features of construction, arrangement and combination of parts, hereinafter fully set forth and claimed.

The invention is clearly illustrated in the drawing accompanying this specification, in which.

Figure 1:
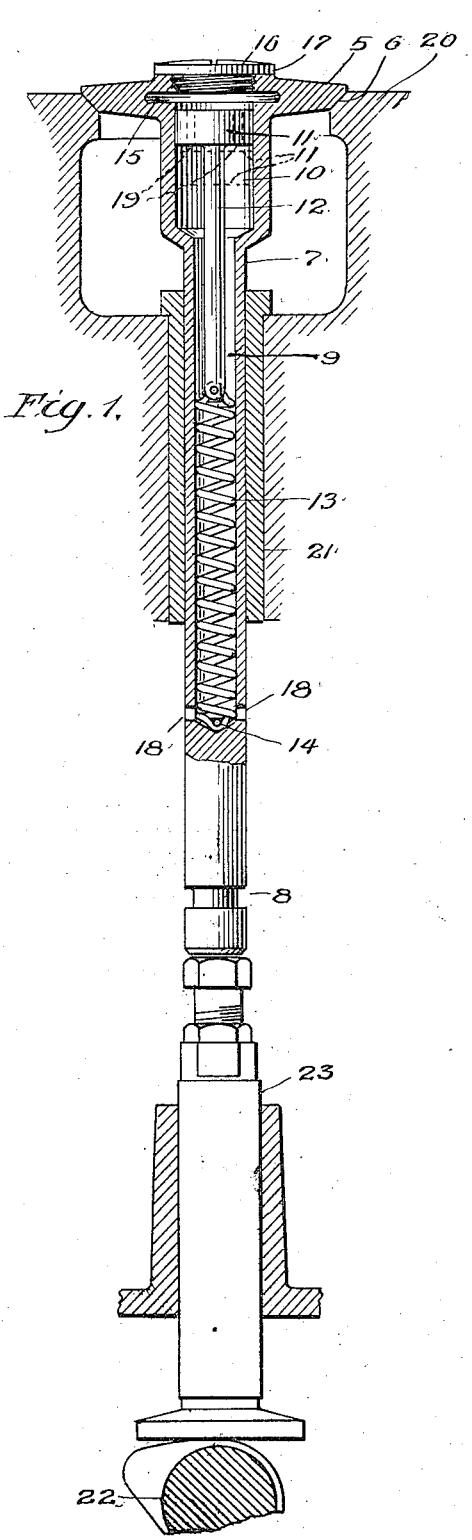
Fig. 1 is a vertical longitudinal section through a poppet valve embodying a simple form of the present invention, showing the same in connection with a fragment of a motor block and a tappet and cam, and showing the valve seated.

Referring to said drawing, which is illustrative of one embodiment of the invention, the reference character 5 designates the head of the valve which is of the ordinary disc-like formation having the usual beveled seating face 6. Projecting from the head is the valve stem 7 formed at its lower end with means to retain a spring (not shown), the means here shown being in the form of a groove 8 for receiving the spring retaining washer (not shown).

In its preferred form, the valve stem is hollow as at 9 and its upper end is increased in diameter somewhat to provide a cylinder 10 in which is a plunger 11 carried by a stem 12 which projects down into the hollow part 9 of the valve stem. Means are provided for holding the plunger relatively stationary, during up strokes of the valve when the motor is run at high speed, and in the embodiment of the invention illustrated, a coiled compression spring 13 yieldably supports the plunger normally at a point adjacent the upper end of the cylinder 10 and this spring is made of sufficient size and strength to support the plunger at the upper end of the cylinder when the valve is at rest, and of sufficient resiliency to permit it to be momentarily compressed, under very rapid up strokes of the valve, without lifting the plunger through any appreciable extent while the valve is being lifted. When the valve is reciprocated slowly, the plunger moves with the valve or at least has but a slight relative movement with respect thereto, and as the speed of the motor and frequency of the reciprocation of the valve increases, the plunger assumes a more nearly stationary condition on the up strokes of the valve and is suddenly lifted by the compressed spring during the interval of rest at the top of the upstrokes, and moves down with the valve on its down strokes.

In the form of the invention illustrated, the upper end of the spring is attached to the lower end of the plunger stem 12 and its lower end is attached to a pin 14 fastened in the wall of the valve stem.

The hollow or cavity in the valve stem is desirably formed by boring the same inward from the upper face of the valve head, and in some instances, particularly in large size valves, an air chamber 15 is cut back into the valve head from the top of the cylinder 10. The upper end of the cavity is closed by a plug 16 which is screwed into the upper end of the bore. Desirably the plug is formed with a shouldered part 17 which seats tightly upon the upper face of the valve head.

In the lower end of the hollow part of the valve stem are orifices 18 through which hot air is discharged from the cavity in the valve stem, and through which cool air is admitted thereto, and desirably one or more apertures 19 are formed through the plunger 11 to permit the passage of a limited amount of air from one side thereof to the other.

In accordance with the common practice, the valve head seats upon a valve seat formed in the motor block, a fragment of which is shown at 20, and the stem is guided in a valve guide 21 mounted in the motor block as usual. As is well understood a cam shaft 22 with cams thereon, is employed to lift the several valves of the motor and a valve tappet 23 is interposed between each cam and valve stem. These parts are well known and require no further description so far as this specification is concerned.

In the operation of an internal combustion engine, the hot gases discharge through the valve opening between the valve seat and the head of the valve, when the valve is lifted, and strike the exposed part of the valve stem above the valve guide. This part of the valve is subjected to the most intense heat of the burnt gases and ordinarily the heat is conducted up into the valve head, sometimes causing premature explosions and softening the head with the resulting improper seating of the valve on its valve seat.

In the operation of motors, the lifting action of the cam is slower than lowering action, and there is a slight pause at the time the valve is fully open and a greater pause when the valve is fully closed. This is due to the shape of the cam. It is understood, however, that these movements are exceedingly rapid and the pauses occupy very little time.

When the motor is running slowly, and the valve is reciprocated slowly, relatively speaking, on the up strokes of the valve, the spring and plunger are bodily lifted without much if any compression of the spring and only a small amount of movement of the valve relative to the plunger take place. When, however, the motor is speeded up, the frequency of the reciprocations of the valve increases, and the weight of the plunger then momentarily overbalances the lifting action of the spring on the up strokes of the valve, whereupon the spring is compressed slightly, without appreciably lifting the plunger (see solid lines in Fig. 2) and as a result hot air which may have accumulated in the cylinder 10 below the plunger is forced down the hollow in the valve stem and discharged through the orifices 18. When the valve reaches the top of its stroke, it pauses momentarily, and during this slight interval of time, the spring expands, forcing the plunger up to the upper end of its stroke, relative to the valve (see dotted lines in Fig. 2) thereby enlarging the cavity in the cylinder 10 below it, creating a partial vacuum therein, and permitting cool air to enter the cavity in the stem through the orifices 18, which cool air absorbs the heat radiated to it by the walls of the valve stem.

Figure 2:
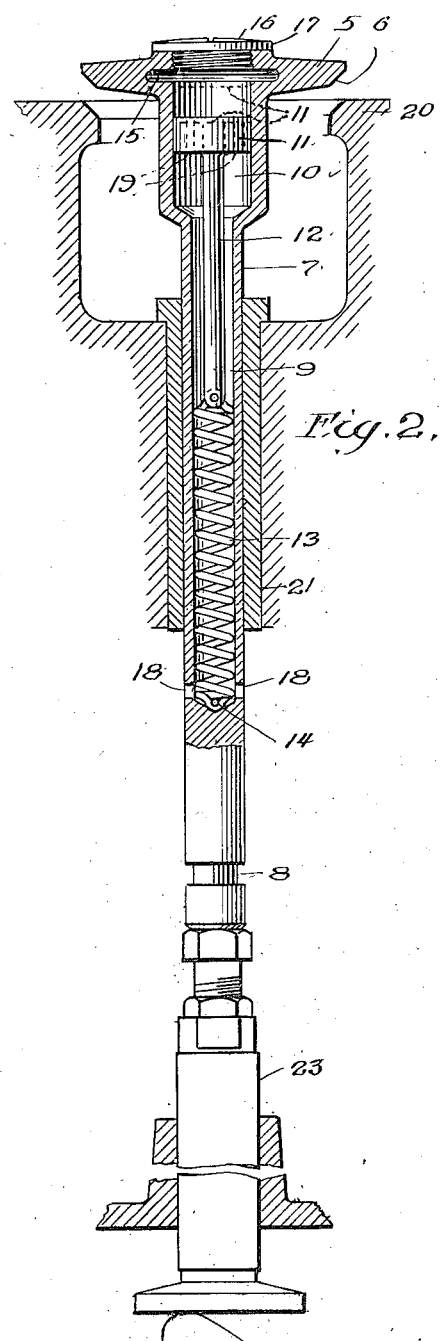
Fig. 2 is a view of the same parts showing the valve lifted.

On the down stroke of the valve, with the plunger disposed at the upper end of the cylinder as shown in dotted lines in Fig. 2, the plunger moves down with the valve (the spring being now fully expanded) and as the valve strikes upon its seat, the plunger continues its movement downwards, due to its own momentum (see dotted lines in Fig. 1) forcing the heated air in the cylinder down through the cavity in the stem and expelling the greater portion thereof, since the impact of the plunger on the air is sudden and swift and the diameter of the cylinder is considerably greater than the passage through the rest of the stem. During the down stroke of the valve, the spring is extended a trifle since, due to the inertia of the stationary plunger at the top of the stroke of the valve, it lags momentarily, so that the spring is put under slight tension, which in addition to the momentum of the downwardly moving valve causes the plunger to continue its downward movement after the valve has seated itself, thereby through the spring, pressing the valve down on its seat and simultaneously discharging the heated air from the cylinder forcing it down through the cavity in the stem and discharging it through the orifices 18.

During the interval that the valve pauses on its seat, the spring expands and restores the plunger to the top of the cylinder, thereby creating a partial vacuum in the lower part of the cylinder and permitting cool air to enter the cavity in the stem.

It will be seen, therefore, that there is a cycle of pumping operation during the up stroke and at the top of the up stroke of the valve and another cycle of pumping operation at the seating moment, whereby the air is changed twice during each complete operation of the valve. Furthermore that the momentum of the plunger on its down stroke assists the valve spring in holding the valve down on its seat without the danger of chattering thereon.

The apertures in the plunger permit leakage of air into the air chamber above the plunger and prevent the plunger from being lifted by suction that might otherwise occur in said chamber on the up strokes of the valve.

By reason of the frequent air changes that take place in the hollow of the valve stem, the interior thereof is kept relative cool. The heat imparted to the shell or wall of the valve stem by the hot gases is radiated into the interior of the stem and absorbed by the air therein and as the air is continuously being discharged and replaced by cool air, the heat is removed from the valve stem instead of being conducted to the head by the usual solid stem. Heat applied to the head of the valve from above is likewise absorbed by the air in the interior of the stem and dissipated.

The orifices 18 are open to the cavity in the crank case which contains oil, and oil mist is drawn into the cavity in the valve stem, and collects on the internal walls thereof and acts to absorb heat and also to lubricate the plunger.

Valves embodying the present invention are not only kept relatively cool, but they may be constructed of ordinary steels, thereby effecting a great saving in cost over valves that are made of expense materials in accordance with the prevailing practice.

I claim as new and desire to secure by Letters Patent:

1. An air cooled poppet valve comprising a valve body formed of a disc-like head and a hollow stem provided with a cavity which is closed at its upper end and having orifices at the lower end thereof for admitting relatively cool air to the hollow of the stem, a plunger contained entirely in the hollow of the stem, and a resilient mounting for holding the plunger substantially stationary during the upstrokes of rapid reciprocations of the valve body, and acting to move the plunger upward at the limit of the upstrokes.

2. An air cooled poppet valve comprising a valve body formed of a disc-like head and a stem, there being a cylindrical cavity in the upper part of the stem closed at its top and having an air passage opening out through the lower end of the stem to a relatively cool place, a plunger contained entirely in said cylindrical cavity, and a resilient mounting for the plunger adapted to support the plunger in a substantially stationary condition during the upstrokes of rapid reciprocations of the valve body, and acting to move the plunger upward at the limit of the upstrokes.

3. An air cooled poppet valve comprising a valve body formed of a disc-like head and a hollow stem having a cylindrical cavity adjacent the head closed at its top and having a bore leading down therefrom and opening outward at its lower end to a relatively cool place, a plunger located entirely in said cylindrical cavity and a resilient mounting for said plunger connecting the plunger with the stem.

4. An air cooled poppet valve, comprising a valve body formed of a disc-like head and a hollow stem having a cylindrical cavity adjacent the head closed at its top and communicating with an outwardly opening air passageway therebelow, a plunger located entirely in said cylindrical cavity and a compression spring yieldably supporting said plunger and attached to the stem.

5. An air cooled poppet valve comprising a valve body formed of a disc-like head and a hollow stem having a cylindrical cavity adjacent the head closed at its top and having a reduced bore leading from said cylindrical cavity and opening outwards at its lower end to a relatively cool place, a plunger located entirely in said cylindrical cavity and a coiled compression spring supporting the plunger and connecting the same with the stem.

6. An air cooled poppet valve comprising a valve body formed of a disc-like head and a stem, there being a cylindrical cavity in the stem adjacent the head, opening at one end to an air chamber in the head and opening at the other end to a reduced bore in the stem, and there being orifices through the wall of the stem at the lower end of the bore for admission of relatively cool air, a plunger located entirely in said cylindrical cavity having a stem entering said bore, there being an aperture through said plunger, and a coiled compression spring attached to said plunger stem and to the valve stem.

7. Air cooling means for poppet valves, comprising a valve body formed of a disc-like head and a hollow stem the cavity of which is closed at its top, said stem being formed with orifices adjacent its lower end through which relatively cool air may pass to and from the interior of the stem, a plunger located entirely in said cavity, a coiled compression spring forming the support for said plunger and connecting it with the stem and mechanical means for reciprocating the valve body relative to the plunger whereby air is pumped to and from the interior of the stem, 8. Air cooling means for poppet valves, comprising a valve body formed of a disc-like head and a hollow stem, the cavity of which is closed at its top, said stem being formed with orifices adjacent its lower end through which relatively cooled air may pass to and from the interior of the stem, a plunger located entirely in said cavity, a resilient support for holding the plunger substantially stationary during the upstrokes of rapid reciprocations of the valve body and moving the plunger upward at the limit of the upstrokes, and mechanical means for reciprocating the valve body relative to the plunger whereby air is pumped to and from the interior of the stem.

9. A downwardly closing poppet valve comprising a valve body formed of a disc like head and a hollow stem, the cavity of which is closed at the top, a plunger reciprocating entirely in the hollow of the stem, and a yieldable support for the plunger connected to the plunger and to the valve stem and arranged to be compressed during up strokes of the valve and expanded to normal at the top of the up stroke of the valve, the plunger, on the down stroke of the valve, operating under its own momentum, to continue its down movement against the action of the spring and thereby apply down pressure of the valve on its seat.

10. A downwardly closing poppet valve, comprising a valve body formed of a disc like head and a hollow stem, the cavity of which is closed at the top, a plunger reciprocating entirely in the hollow of the stem, and a coiled compression spring in the hollow of the stem connecting the plunger with the stem and yieldably supporting the plunger, whereby on down strokes of the valve, the plunger, at the bottom of the down stroke of the valve, acts to force the valve down on its seat.

11. A downwardly closing poppet valve comprising a valve body formed of a disc like head and a hollow stem having a cylindrical cavity at its upper end, a plunger reciprocating entirely in said cylindrical cavity, and a coiled compression spring connecting the plunger with the stem and yieldably supporting the plunger, whereby on down strokes of the valve, the plunger operates to store up energy and force the valve down on its seat, when it seats.

12. A poppet valve having a hollow stem, the cavity of which is closed at its top and opens outward at the bottom, a body reciprocating entirely in the hollow of the stem, and a coiled spring yieldably supporting said body and connected to the stem and body.

GEORGE R. RICH.